United States Patent
Kawahito et al.

(10) Patent No.: US 9,430,205 B2
(45) Date of Patent: Aug. 30, 2016

(54) CONTROLLING EXECUTION OF BINARY CODE

(71) Applicant: International Business Machines Corporation, Armonk, NY (US)

(72) Inventors: Motohiro Kawahito, Tokyo (JP); Toshihiko Koju, Tokyo (JP); Xin Tong, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 44 days.

(21) Appl. No.: 14/634,018

(22) Filed: Feb. 27, 2015

(65) Prior Publication Data

US 2015/0268942 A1   Sep. 24, 2015

(30) Foreign Application Priority Data

Mar. 18, 2014  (JP) .................................. 2014-055409

(51) Int. Cl.
| | |
|---|---|
| *G06F 9/44* | (2006.01) |
| *G06F 9/45* | (2006.01) |
| *G06F 11/07* | (2006.01) |
| *G06F 21/00* | (2013.01) |

(52) U.S. Cl.
CPC ............. *G06F 8/52* (2013.01); *G06F 11/0703* (2013.01); *G06F 21/00* (2013.01)

(58) Field of Classification Search
None
See application file for complete search history.

(56) References Cited

U.S. PATENT DOCUMENTS

| | | | | |
|---|---|---|---|---|
| 6,820,254 B2 * | 11/2004 | Smith et al. ............ | G06F 8/443 | 717/151 |
| 6,820,255 B2 * | 11/2004 | Babaian et al. .... | G06F 9/45504 | 711/4 |
| 7,707,578 B1 * | 4/2010 | Zedlewski et al. ... | G06F 9/5027 | 712/215 |
| 2002/0166016 A1 * | 11/2002 | Stoodley et al. ... | G06F 9/44521 | 710/200 |
| 2007/0180438 A1 * | 8/2007 | Suba ..................... | G06F 8/4441 | 717/151 |
| 2010/0205602 A1 * | 8/2010 | Zedlewski et al. ... | G06F 9/5027 | 718/1 |
| 2012/0255012 A1 * | 10/2012 | Sallam ................... | G06F 21/52 | 726/24 |

FOREIGN PATENT DOCUMENTS

| | | |
|---|---|---|
| JP | 2002502516 A | 1/2002 |
| JP | 2006178646 A | 7/2006 |
| JP | 2007531074 A | 11/2007 |

(Continued)

OTHER PUBLICATIONS

List of IBM Patents or Patent Applications Treated as Related; JP920140015US1, Date Filed: Feb. 27, 2015, pp. 1-2.

(Continued)

*Primary Examiner* — Daxin Wu
(74) *Attorney, Agent, or Firm* — Cantor Colburn LLP; Kelvan Razavi

(57) ABSTRACT

An apparatus for controlling an execution of a binary code by multiple threads includes a detection unit configured to detect an occurrence of modification of a first part that is a part of a first binary code by a self-modifying code; a specifying unit configured to specify a second part that is a part corresponding to the first part in a second binary code acquired by converting the first binary code, in response to detection of the occurrence of modification of the first part by the self-modifying code; and a correction unit configured to correct the second part such that a specific thread that executes the second part of the second binary code among the multiple threads causes an exception.

9 Claims, 8 Drawing Sheets

(56) References Cited

FOREIGN PATENT DOCUMENTS

| | | |
|---|---|---|
| JP | 2010525440 A | 7/2010 |
| JP | 2011040087 A | 2/2011 |

OTHER PUBLICATIONS

Motohiro Kawahito, et al., "Controlling Execution of Binary Code," U.S. Appl. No. 14/746,875, filed Jun. 23, 2015.

* cited by examiner

```
0x402F28:   mov     $0x4,%r8d
0x402F2E:   mov     $0x413e50,%ecx
0x402F33:   mov     $0x413e20,%edx
0x402F38:   mov     $0x4125ec,%edi
0x402F3D:   callq   0x40a460
```
11

```
0x702F28:   mov     $0x4,%r8d
0x702F2E:   mov     $0x413e50,%ecx
0x702F33:   mov     $0x413e20,%edx
0x702F38:   mov     $0x4125ec,%edi
0x702F3D:   push    0x40a460, jmp rt
```
21

```
0x702F28:     mov      $0x4,%r8d
0x702F2E:     mov      $0x413e50,%ecx
0x702F33:     mov      $0x413e20,%edx
0x702F38:     mov      $0x4125ec,%edi
0x702F3D:     push     0x40a460, jmp rt
```
21

```
0x702F28:          int3  ...
0x702F2E:          int3  ...
0x702F33:          int3  ...
0x702F38:          int3  ...
0x702F3D:          int3  ...
```
22

```
0x702F28:          int3  ...
0x702F2E:          int3  ...
0x702F33:          int3  ...
0x702F38:          int3  ...
0x702F3D:          int3  ...
```
22

CONTROLLING EXECUTION OF BINARY CODE

FOREIGN PRIORITY

This application claims priority to Japanese Patent Application No. 2014-055409, filed Mar. 18, 2014, and all the benefits accruing therefrom under 35 U.S.C. §119, the contents of which in its entirety are herein incorporated by reference.

BACKGROUND

The present invention relates generally to a controlling execution of a binary code and, more specifically, to a device and method of controlling an execution of a binary code by multiple threads.

There is a case where, while a converted binary code acquired by converting an original binary code is executed, part of the original binary code modifies itself. Such a code that modifies itself is called SMC (Self-Modifying Code). When the modification by this SMC occurs, it becomes impossible to use part of a converted binary code corresponding to the modified part.

JP2011-40087A discloses that, when writing in a protected page is attempted (for example, writing by a self-correcting code or in a page in which a text and data are mixed), it is trapped and the page is set without protection again.

JP2002-502516A discloses that, since a self-modifying code is used to often rewrite an instruction and therefore the conversion is repeatedly returned to a state of "original", even in a case where the attempt to convert the instruction is useless, an instruction of type EXECUTED is used.

JP2010-525440A discloses that it is possible to intentionally install a segmentation violation as a trap to detect a case where a target code attempts access to an area in which a memory is protected, such as a case where it attempts writing in a self-modifying code.

SUMMARY

In one embodiment, an apparatus for controlling an execution of a binary code by multiple threads includes a detection unit configured to detect an occurrence of modification of a first part that is a part of a first binary code by a self-modifying code; a specifying unit configured to specify a second part that is a part corresponding to the first part in a second binary code acquired by converting the first binary code, in response to detection of the occurrence of modification of the first part by the self-modifying code; and a correction unit configured to correct the second part such that a specific thread that executes the second part of the second binary code among the multiple threads causes an exception.

In another embodiment, an apparatus for controlling an execution of a binary code by multiple threads includes a generation unit configured to generate an optimized binary code by optimizing an original binary code; a detection unit configured to detect an occurrence of modification of a first part that is a part of the original binary code by a self-modifying code while multiple threads execute the optimized binary code; a specifying unit configured to specify a second part that is a part corresponding to the first part in the optimized binary code, in response to detection of the occurrence of modification of the first part by the self-modifying code; a correction unit configured to correct the second part such that a specific thread that executes the second part of the optimized binary code among the multiple threads causes an exception; and a control unit configured to perform control such that the specific thread executes the first part of the original binary code modified by the self-modifying code when the exception occurs.

In another embodiment, a method of controlling an execution of a binary code by multiple threads includes detecting an occurrence of modification of a first part that is a part of a first binary code by a self-modifying code; specifying a second part that is a part corresponding to the first part in a second binary code acquired by converting the first binary code, in response to detection of the occurrence of modification of the first part by the self-modifying code; and correcting the second part such that a specific thread that executes the second part of the second binary code among the multiple threads causes an exception.

In another embodiment, a non-transitory, computer readable storage medium has computer readable instructions stored thereon that, when executed by a computer, implement a method of controlling an execution of a binary code by multiple threads. The method includes detecting an occurrence of modification of a first part that is a part of a first binary code by a self-modifying code; specifying a second part that is a part corresponding to the first part in a second binary code acquired by converting the first binary code, in response to detection of the occurrence of modification of the first part by the self-modifying code; and correcting the second part such that a specific thread that executes the second part of the second binary code among the multiple threads causes an exception.

BRIEF DESCRIPTION OF THE DRAWINGS

FIG. 5 is a diagram illustrating separation of divergence to an invalid trace, which is executed before the change in a call of a new trace, and so on;

DETAILED DESCRIPTION

Figure 1:
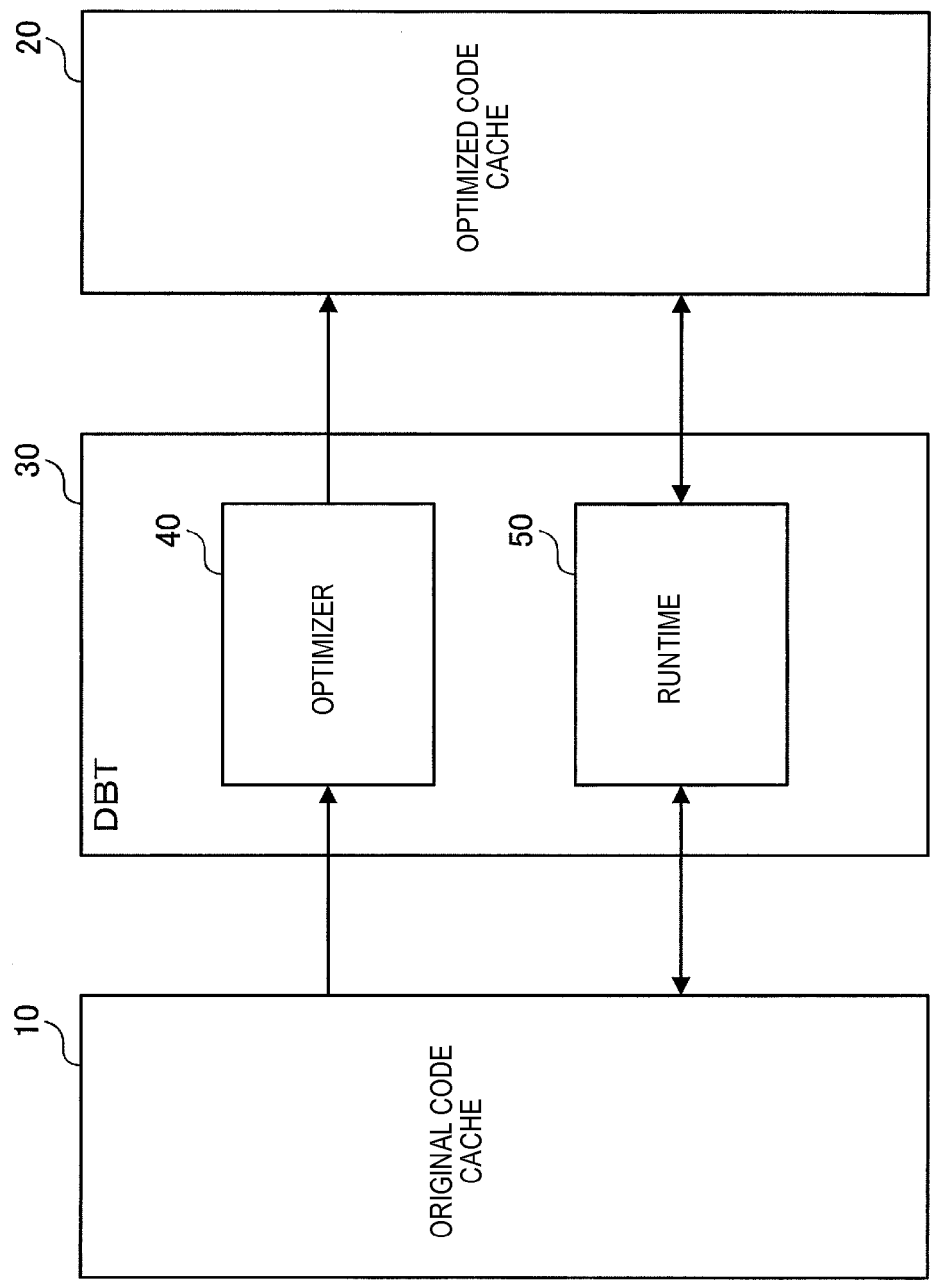
FIG. 1 is a diagram illustrating a functional configuration example of a binary conversion device in an embodiment of the present invention.

As described above, when modification by SMC occurs, since it is not possible to use part of a converted binary code, it is necessary to recover from such a state. At that time, the improvement of performance of the recovering processing is desired. Although the above described techniques relate to a self-modifying code, they do not suggest means for improving the performance of such recovering processing.

Accordingly, embodiments of the present invention improve the performance of processing to recover from a state where it is not possible to use part of a converted binary code due to the occurrence of modification by SMC. More specifically, embodiments of the present invention provide a device that controls an execution of a binary code by multiple threads, including: a detection unit configured to detect an occurrence of modification by a self-modifying code, of a first part that is a part of a first binary code; a specifying unit configured to specify a second part that is a part corresponding to the first part in a second binary code acquired by converting the first binary code, in response to detection of the occurrence of modification by the self-modifying code, of the first part; and a correction unit configured to correct the second part such that a specific thread that executes the second part of the second binary code among the multiple threads causes an exception.

In this device, the correction unit may correct the second part by replacing at least one instruction corresponding to an instruction included in the first part and modified by the self-modifying code among multiple instructions included in the second part, with an interrupt instruction.

Moreover, this device may further include a control unit configured to perform control such that the specific thread executes the first part of the first binary code modified by the self-modifying code when the exception occurs. In that case, the control unit may perform control such that the specific thread executes the first part of the first binary code after a link from other parts than the second part of the second binary code to the second part is separated.

Furthermore, this device may further include a maintenance unit configured to maintain a state where a page which is a memory area to store at least part of the first part and include an instruction modified by the self-modifying code is mapped to a virtual page to which page protection is not applied and which is not used, while the specifying unit specifies the second part and the correction unit corrects the second part.

Moreover, embodiments of the present invention also provide a device that controls an execution of a binary code by multiple threads, including: a generation unit configured to generate an optimized binary code by optimizing an original binary code; a detection unit configured to detect an occurrence of modification by a self-modifying code, of a first part that is a part of the original binary code while multiple threads execute the optimized binary code; a specifying unit configured to specify a second part that is a part corresponding to the first part in the optimized binary code, in response to detection of the occurrence of modification of the first part by the self-modifying code; a correction unit configured to correct the second part such that a specific thread that executes the second part of the optimized binary code among the multiple threads causes an exception; and a control unit configured to perform control such that the specific thread executes the first part of the original binary code modified by the self-modifying code when the exception occurs.

Furthermore, embodiments of the present invention also provide a method of controlling an execution of a binary code by multiple threads, including detecting an occurrence of modification by a self-modifying code, of a first part that is a part of a first binary code; specifying a second part that is a part corresponding to the first part in a second binary code acquired by converting the first binary code, in response to detection of the occurrence of modification of the first part by the self-modifying code; and correcting the second part such that a specific thread that executes the second part of the second binary code among the multiple threads causes an exception.

Furthermore, embodiments of the present invention also provide a program that causes a computer to function as a device that controls an execution of a binary code by multiple threads, and causes the computer to function as: a detection unit configured to detect an occurrence of modification by a self-modifying code, of a first part that is a part of a first binary code; a specifying unit configured to specify a second part that is a part corresponding to the first part in a second binary code acquired by converting the first binary code, in response to detection of the occurrence of modification of the first part by the self-modifying code; and a correction unit configured to correct the second part such that a specific thread that executes the second part of the second binary code among the multiple threads causes an exception.

According to embodiments of the present invention, the performance of processing to recover from a state where it is not possible to use part of a converted binary code due to the occurrence of modification by SMC, improves.

FIG. 1 is a diagram illustrating a functional configuration example of a binary conversion device (instruction emulator) 1 in the present embodiment. As illustrated in the figure, this binary conversion device 1 includes an original code cache 10, an optimized code cache 20 and a DBT (Dynamic Binary Translator) 30. The DBT 30 includes an optimizer 40 and a runtime 50.

The original code cache 10 stores an original binary code before optimization by the optimizer 40. The optimized code cache 20 stores an optimized binary code after optimization by the optimizer 40. The optimizer 40 generates the optimized binary code by optimizing the original binary code stored in the original code cache 10 and stores this optimized binary code in the optimized code cache 20. In the present embodiment, the optimizer 40 is installed as one example of a generation unit to generate the optimized binary code.

The runtime 50 controls an execution of the optimized binary code stored in the optimized code cache 20 by multiple threads. Especially, it controls an execution in a case where the original binary code is modified by SMC while multiple threads execute the optimized binary code. In general, it is possible to deal with the SMC in the binary conversion device 1 as described in further detail below.

Figure 2:
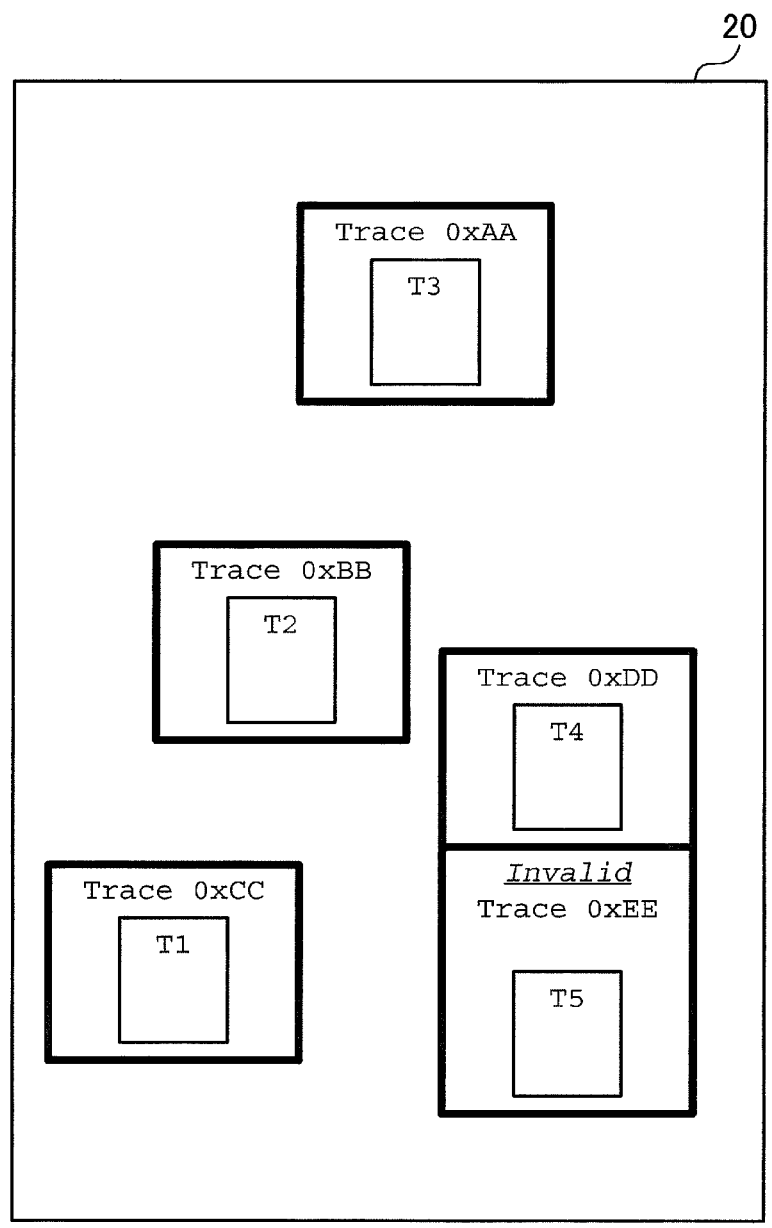
FIG. 2 is a diagram illustrating an example of traces stored in an optimized code cache.

FIG. 2 is a diagram illustrating an example of traces stored in the optimized code cache 20. Here, the trace is a compile unit having one entry and multiple exits. In the figure, traces 0xAA, 0xBB, 0xCC, 0xDD and 0xEE are stored. Moreover, among these, trace 0xEE is assumed to be invalid as written by "Invalid". Further, in the figure, the name of a thread that executes a trace is shown in the trace. For example, thread T1 executes trace 0xCC, and thread T2 executes trace 0xBB. Meanwhile, thread T5 executes trace 0xEE that becomes invalid. However, the DBT 30 (see FIG. 1) is sure never to know that. It is because the DBT 30 does not explicitly trace a place which each thread executes in a code cache. Thus, since there is no efficient mechanism that specifies where in the code cache a thread executes, global synchronization is required.

Figures 3A, 3B, 3C:
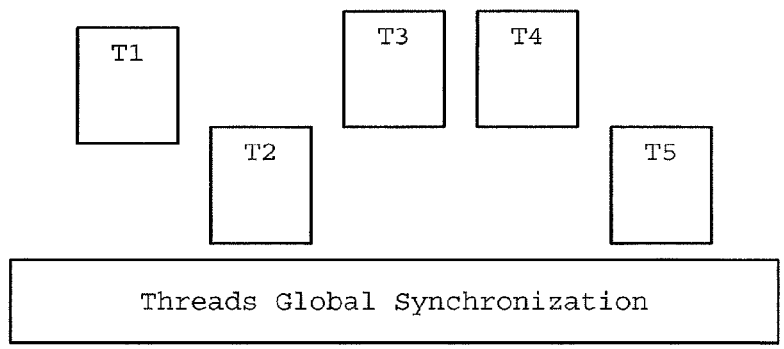
FIG. 3(a) is a diagram illustrating an instruction sequence of an original binary code.
FIG. 3(b) is a diagram illustrating that global synchronization is performed on all operating threads.
FIG. 3(c) is a diagram illustrating an instruction sequence of optimized binary codes to be removed after the global synchronization is performed.

FIG. 3 is a diagram illustrating such global synchronization. FIG. 3(a) indicates an instruction sequence 11 of trace 0xEE of the original binary code stored in the original code cache 10. In this instruction sequence 11, as shown by the underline, it is assumed that thread T5 modifies address "0x402F38" by SMC. By this means, as illustrated in FIG. 2, trace 0xEE becomes invalid. FIG. 3(*b*) shows that global synchronization is performed on all operating threads T1 to T5. FIG. 3(*c*) shows an instruction sequence 21 of trace 0xEE of the optimized binary code stored in the optimized code cache 20, which should be removed after global synchronization is performed. That is, to strengthen the consistency sequentially, the DBT 30 (see FIG. 1) performs global synchronization on all threads to remove an invalid trace. However, when the global synchronization is performed, all threads have to be stopped and therefore processing is delayed.

Moreover, when the global synchronization is to be performed, there is a possibility of falling into an infinite waiting state. For example, although one of the threads waits by a conditional variable, the other threads wait by a synchronous point. That is, it is assumed that one of the threads waits that the value of a certain variable becomes one. In that case, when the other threads are stopped by global synchronization, this thread continues to wait that the value of the variable becomes one, it becomes impossible to realize the global synchronization.

Therefore, in the present embodiment, correction to write a software interruption instruction in a trace that becomes invalid is performed using a thread that causes modification by SMC. In the present embodiment, this correction is called "poisoning".

Figures 4A, 4B, 4C:
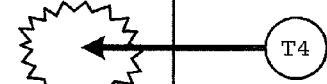
FIG. 4(a) is a diagram illustrating that an instruction sequence of optimized binary codes is specified.
FIG. 4(b) is a diagram illustrating an instruction sequence after poisoning is performed.
FIG. 4(c) is a diagram illustrating that interruption occurs in an instruction sequence after poisoning is performed.

FIG. 4 is a diagram illustrating such poisoning. FIG. 4(*a*) shows that, when modification by SMC occurs in trace 0xEE of the original binary code stored in the original code cache 10, the instruction sequence 21 of trace 0xEE of the optimized binary code stored in the optimized code cache 20 is specified. FIG. 4(*b*) shows that an instruction sequence 22 after poisoning is performed on invalid trace 0xEE of the optimized binary code. Here, the software interruption instruction is, for example, an int3 instruction in x86. FIG. 4(*c*) shows that interruption is caused when thread T4 executes the instruction sequence 22 after poisoning is performed on trace 0xEE. By doing this, since it becomes possible to specify a thread that executes trace 0xEE among all operating threads T1 to T5, it is not necessary to perform global synchronization. Afterward, the DBT 30 (see FIG. 1) is changed to call new trace 0xEE in place of trace 0xEE subjected to trace poisoning.

Figure 5:
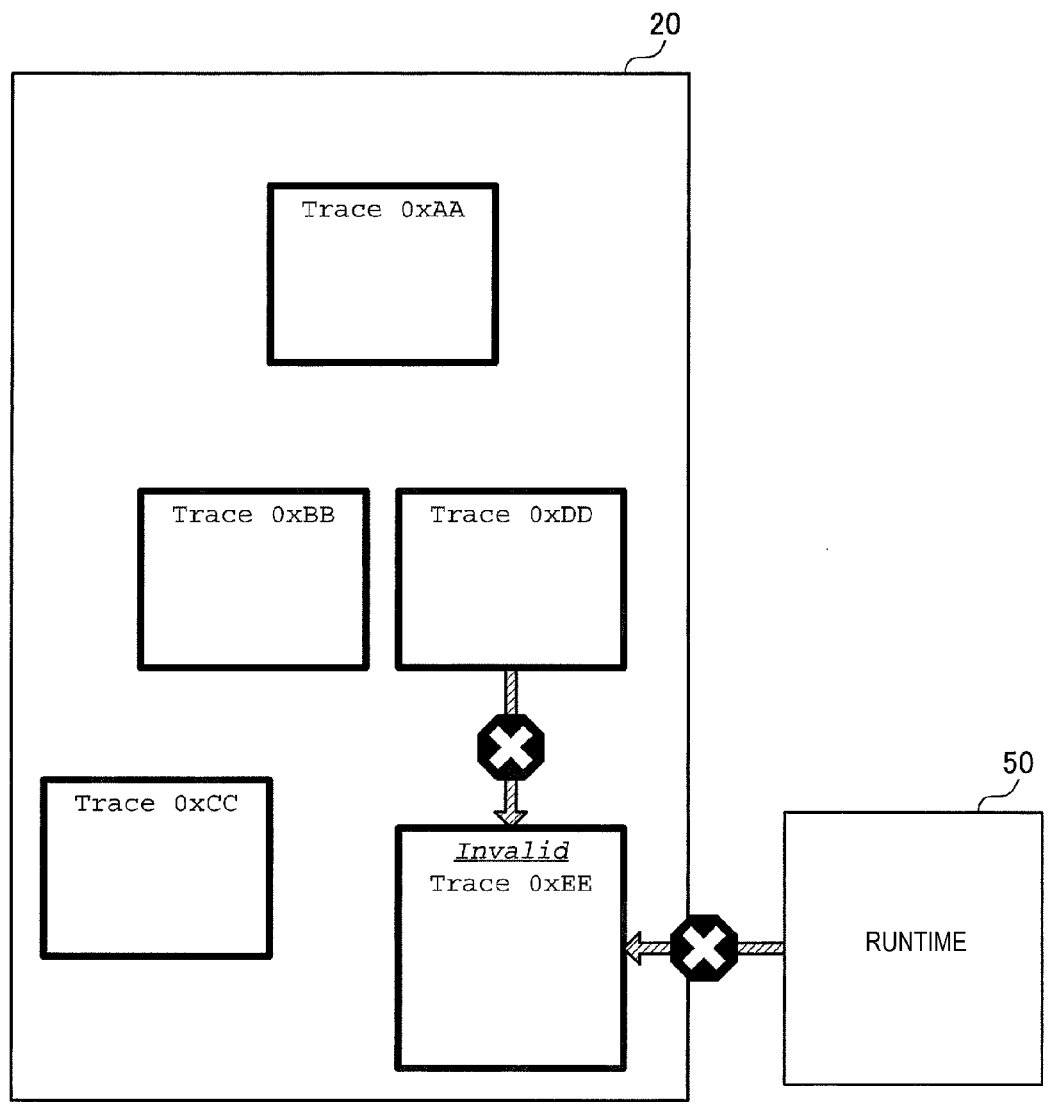

FIG. 5 is a diagram illustrating separation of divergence to invalid trace 0xEE, which is executed before the change in a call of this new trace, and so on. The runtime 50 of the DBT 30 separates all divergences that enter invalid trace 0xEE. In the figure, "x" on the arrow from trace 0xDD to trace 0xEE shows this separation. Moreover, since the runtime 50 stores the start addresses of all traces, it replaces the start address of invalid trace 0xEE with the start address of new trace 0xEE. In the figure, "x" on the arrow from the runtime 50 to trace 0xEE shows the replacement of this start address. In a case where the runtime 50 recognizes that all threads exit from traces at least one time after modification by SMC occurs, the traces are safely removed.

Functional Configuration of Runtime in Present Embodiment

Figure 6:
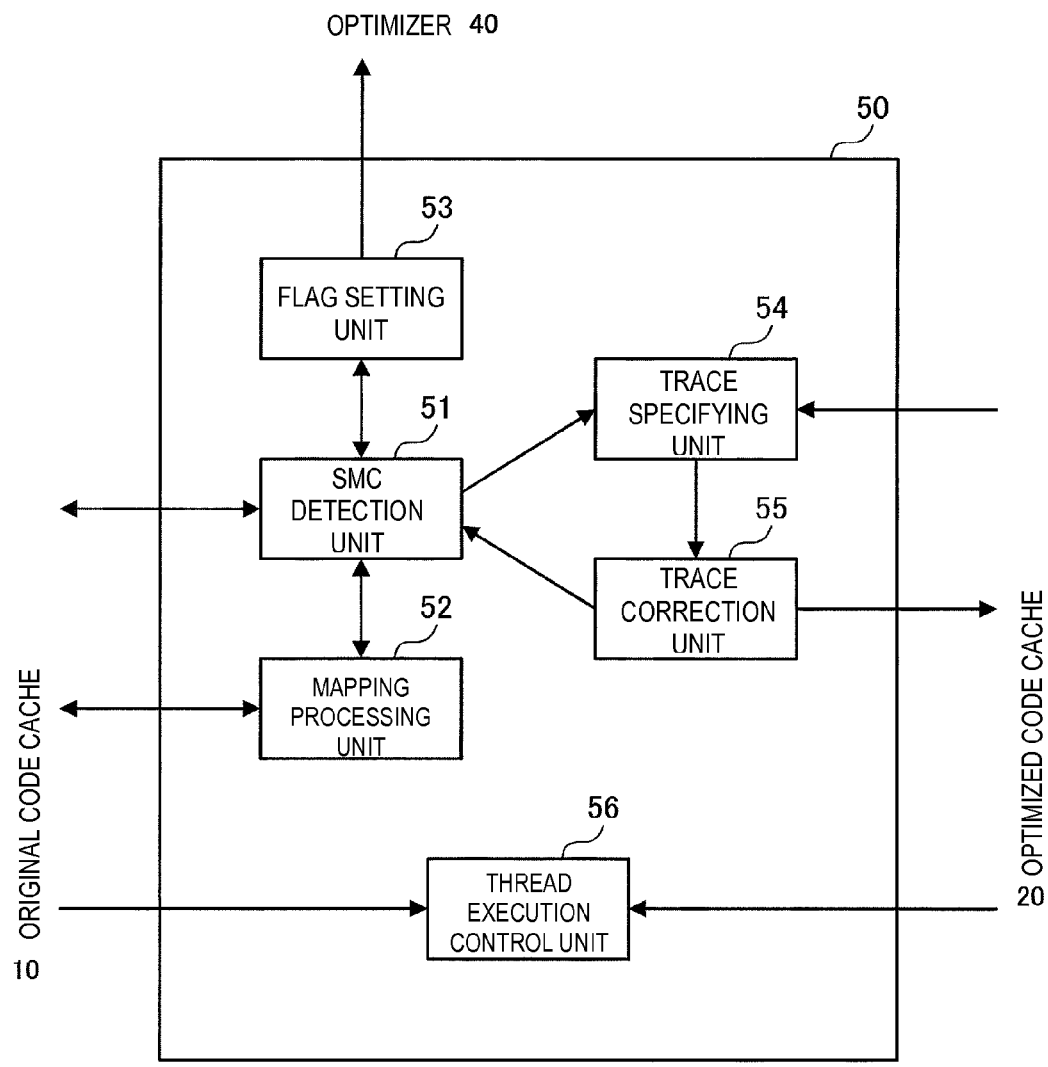
FIG. 6 is a diagram illustrating a functional configuration example of runtime in an embodiment of the present invention.

FIG. 6 is a diagram illustrating a functional configuration example of the runtime 50 to perform the above-mentioned rough operation. As illustrated in the figure, this runtime 50 includes a SMC detection unit 51, a mapping processing unit 52, a flag setting unit 53, a trace specifying unit 54, a trace correction unit 55 and a thread execution control unit 56.

The SMC detection unit 51 applies page protection to the original code cache 10 and detects that an instruction included in a trace with the original binary code is to be modified by SMC. Moreover, it permits original binary code to be modified by the SMC through a virtual page to which the mapping processing unit 52 mapped a page of the original binary code. In the present embodiment, the original binary code is used as one example of the first binary code, and the trace of the original binary code is used as the first part that is a part of the first binary code. Moreover, the SMC detection unit 51 is installed as one example of a detection unit to detect the occurrence of modification of the first part by the self-modifying code.

To enable modification of the original binary code by the SMC, the mapping processing unit 52 maps the page of the original binary code to a virtual page to which page protection is not applied and which is not used. Here, the mapped page is acceptable as long as it is a memory area in which at least part of a trace is stored and which includes an instruction modified by the SMC. Moreover, after the trace specifying unit 54 specifies the trace, the trace correction unit 55 corrects the trace and the SMC detection unit 51 permits the modification by the SMC, the mapping is released. In the present embodiment, the mapping processing unit 52 is installed as one example of a maintenance unit to maintain a state where the page is mapped.

When the SMC detection unit 51 detects that the original binary code is to be modified by the SMC, the flag setting unit 53 sets an SMC processing flag. Specifically, it turns off the SMC processing flag in the initial state, and, when the SMC detection unit 51 detects that an instruction included in a certain trace is to be modified by the SMC, it turns on the SMC processing flag with respect to the trace and also holds the optimizer 40 in a memory that can be referred to. Further, all threads which the optimizer 40 executes check this SMC processing flag before optimization is performed. This can be mounted by a reading lock or writing lock. That is, although the reading lock is held in a case where normal optimization is performed, the writing lock is held in a case where the modification by the SMC occurs. It seems that a cost to perform optimization is greatly larger than a cost to hold the reading lock or writing lock. By this means, in a case where the SMC processing flag is turned on, other threads do not perform optimization.

The trace specifying unit 54 specifies a trace of an optimized binary code corresponding to a trace of the original binary code to be modified by the SMC. In the present embodiment, the optimized binary code is used as one example of the second binary code acquired by converting the first binary code, and the trace of the optimized binary code is used as one example of the second part that is a part corresponding to the first part of the second binary code. Moreover, the trace specifying unit 54 is installed as one example of a specifying unit to specify the second part.

The trace correction unit 55 performs poisoning by overwriting all instructions included in the trace of the optimized binary code specified by the trace specifying unit 54 with a software interruption instruction. Alternatively, although only an instruction sequence corresponding to an instruction of the original binary code to be modified by the SMC may be overwritten with the software interruption instruction, in the present embodiment, an explanation is given with an assumption that all instructions included in a trace are overwritten with the software interruption instruction. In the present embodiment, the trace correction unit 55 is installed as one example of a correction unit to correct the second part of the second binary code.

The thread execution control unit 56 controls an execution of the optimized binary code by multiple threads. Moreover, in a case where a thread that executes the software interruption instruction written by the trace correction unit 55 causes an exception, it performs control such that the thread executes a trace of the original binary code modified by the SMC. In the present embodiment, the thread execution control unit 56 is installed as one example of a control unit to perform control such that a specific thread executes the first part of the first binary code modified by a self-modifying code.

Operation of Runtime in Present Embodiment

Figure 7:
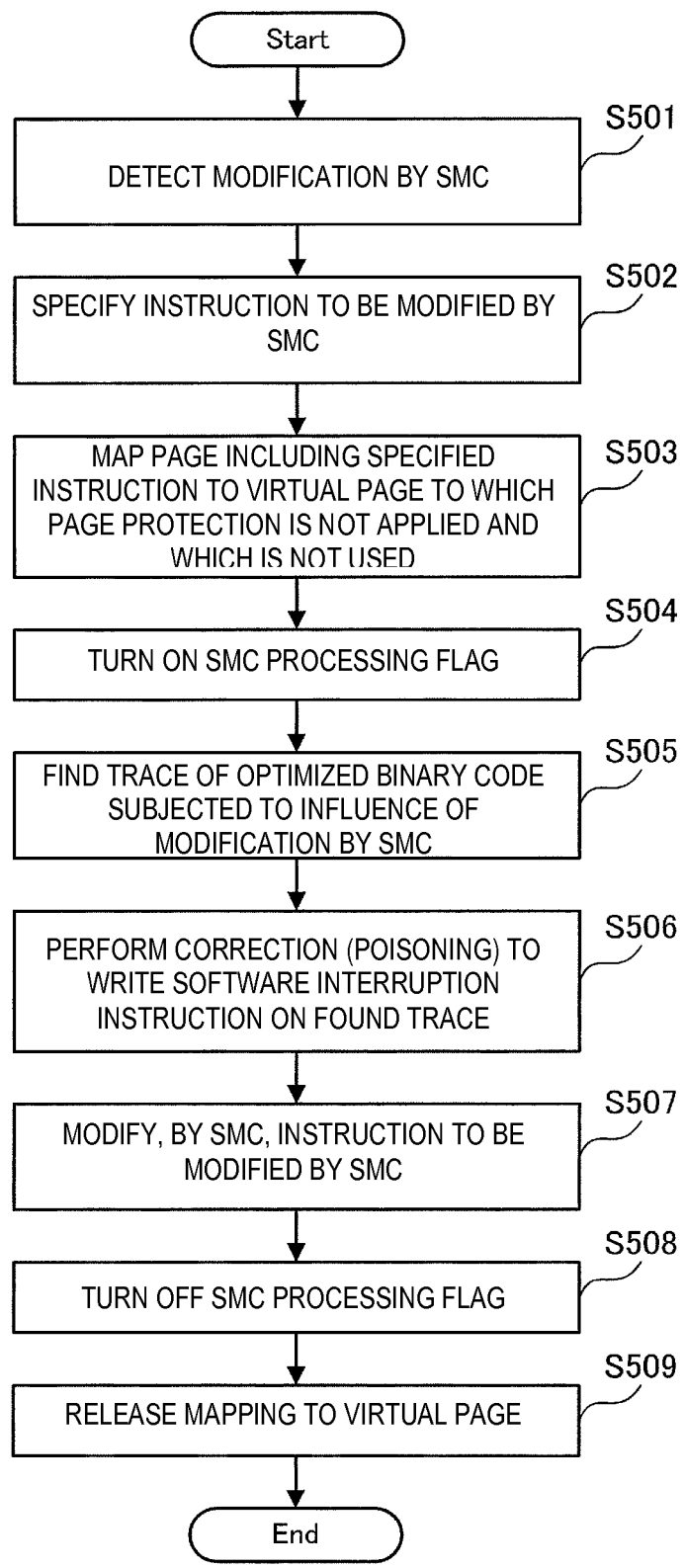
FIG. 7 is a flowchart illustrating an operation example of runtime in an embodiment of the present invention.

FIG. 7 is a flowchart illustrating an operation example of the runtime 50 in the present embodiment.

As illustrated in the figure, in the runtime 50, first, the SMC detection unit 51 detects that the original binary code stored in the original code cache 10 is to be modified by an SMC (operation 501). Specifically, page protection is applied to the original binary code stored in the original code cache 10. In this state, since interruption occurs when the original binary code is to be modified by the SMC, it is possible to detect that the original binary code is to be modified by the SMC.

Then, the SMC detection unit 51 specifies an instruction of the original binary code stored in the original code cache 10 to be modified by the SMC (operation 502). When detecting that the original binary code is to be modified by the SMC, an address to be modified is found. Meanwhile, since correspondence between an instruction and an address has been analyzed by acquisition of identification information and register information of an instruction code, correction of branch destination, and so on, it is possible to easily specify an instruction to be modified by the SMC.

Next, the mapping processing unit 52 maps a page including an instruction of the original binary code stored in the original code cache 10 to be modified by the SMC, to a virtual page to which page protection is not applied and which is not used (operation 503). Here, the unused virtual page can be found by making an inquiry to "/proc/pid/maps" in LINUX®. Also, in WINDOWS®, it is possible to find it by giving NULL to "MapViewOfFileEx( )". In a case where writing is performed without performing global synchronization, it is not possible to turn off a page protection bit and therefore mapping to such a virtual page is required.

Moreover, the flag setting unit 53 turns on an SMC processing flag such that a series of processing succeeds or fails and access from others cannot be performed during processing (operation 504).

Thus, in a state where the SMC processing flag is turned on, first, the trace specifying unit 54 finds all traces of the original binary code subjected to an influence of modification by the SMC among traces stored in the optimized code cache 20 (operation 505).

Next, the trace correction unit 55 performs correction (poisoning) to write a software interruption instruction in all traces subjected to the influence of modification by the SMC, which are found in operation 505 (operation 506). By this means, a thread that executes a trace subjected to poisoning causes interruption.

Next, the SMC detection unit 51 performs modification by the SMC on the instruction specified in operation 502 in the original binary code stored in the original code cache 10, by the use of information obtained by analyzing the instruction (operation 507). By this means, the thread execution control unit 56 performs control such that a thread that causes interruption in response to operation 506 executes a trace of the original binary code modified by the SMC. At this time, as illustrated in FIG. 5, the thread execution control unit 56 performs control such that, after links from other traces to an invalid trace of the optimized binary code are separated, the thread executes the trace of the original binary code modified by the SMC.

When these items of processing end, the flag setting unit 53 turns off the SMC processing flag which is turned on in operation 504 (operation 508). Here, important parts in operations 505 to 507 are expected to be short.

Moreover, the mapping processing unit 52 releases the mapping of the page of the original binary code to the virtual page, which is performed in operation 503 (operation 509). Even in a case where another thread performs modification by the SMC on the same page while processing related to the SMC is performed, a state where mapping up to this timing is performed is maintained such that this can be processed at high speed.

Here, in this operation example, although it is described that the trace of the original binary code modified by the SMC can be executed immediately after operation 507, the trace may be executed after the end of processing in operation 509.

While, in the present embodiment, the thread that executes the trace subjected to poisoning executes the trace of the original binary code modified by the SMC, it is not limited to this. A trace of an optimized binary code may be generated by optimizing the trace of the original binary code modified by the SMC again, and the trace of this optimized binary code may be executed.

Moreover, in the present embodiment, although a case has been described where the present invention is applied to the binary conversion device 1 that performs conversion for optimization on the original binary code, it is not limited to this. It is possible to apply the present invention even if the binary conversion device 1 performs any conversion on the original binary code.

As described above, in the present embodiment, when the original binary code is modified by the SMC, a trace subjected to the influence of a converted binary code acquired by converting the original binary code is specified, and the trace is corrected such that a thread that executes the trace causes an exception. By this means, it becomes possible to improve the performance of processing to recover from a state where part of the converted binary code cannot be used due to the occurrence of modification by the SMC.

Hardware Configuration of Digital Book Display Device of Present Embodiment

Figure 8:
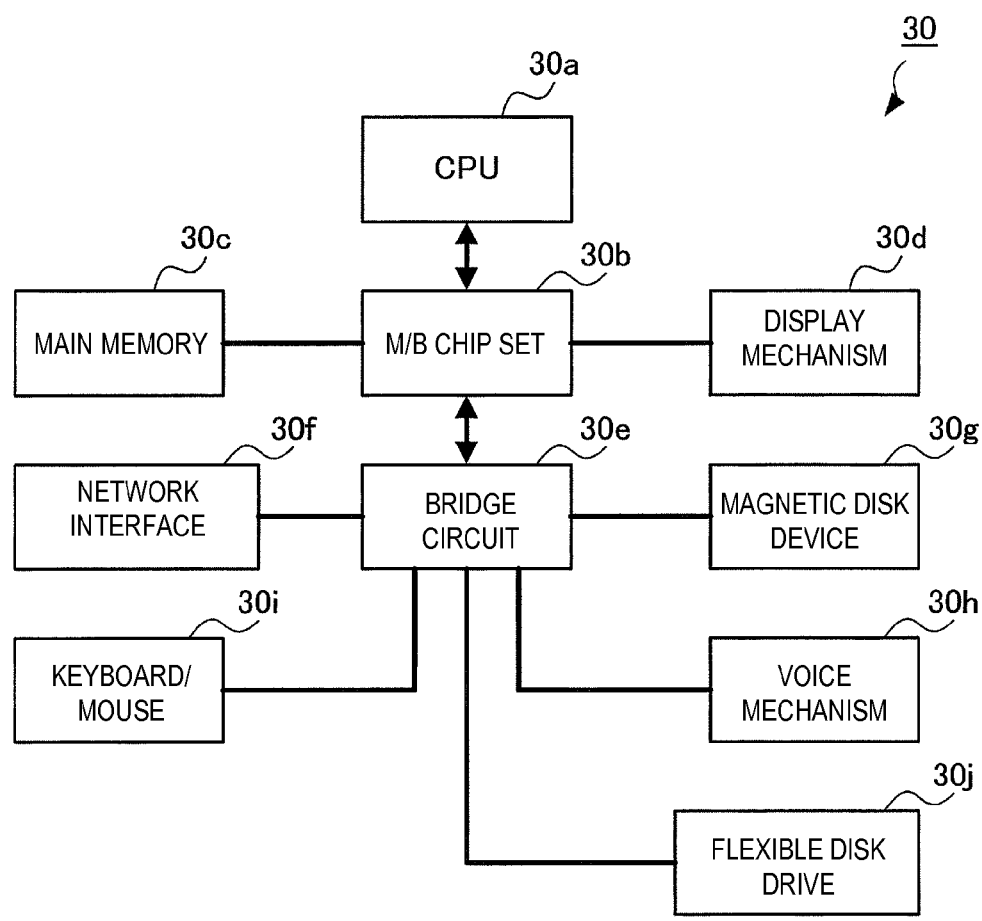
FIG. 8 is a diagram illustrating a hardware configuration example of DBT in an embodiment of the present invention.

FIG. 8 is a diagram illustrating a hardware configuration example of the DBT 30 in the present embodiment. As illustrated in the figure, the DBT 30 includes a CPU (Central Processing Unit) 30*a* which is computation means, a main memory 30*c* connected with the CPU 30*a* through an M/B (motherboard) chip set 30*b*, and a display mechanism 30*d* similarly connected with the CPU 30*a* through the M/B chip set 30*b*. Moreover, a network interface 30*f*, a magnetic disk device (HDD) 30*g*, a voice mechanism 30*h*, a keyboard/mouse 30*i* and a flexible disk drive 30*j* are connected with the M/B chip set 30*b* through a bridge circuit 30*e*.

Here, in FIG. 8, each component is connected through a bus. For example, a CPU bus connects between the CPU 30*a* and the M/B chip set 30*b* or between the M/B chip set 30*b* and the main memory 30*c*. Moreover, although an AGP (Accelerated Graphics Port) may connect between the M/B chip set 30*b* and the display mechanism 30*d*, in a case where the display mechanism 30*d* includes a video card supporting PCI Express, a PCI Express (PCIe) bus may connect between the M/B chip set 30*b* and this video card. Moreover, in the case of connection with the bridge circuit 30e, regarding the network interface 30f, for example, it is possible to use PCI Express. Moreover, regarding the magnetic disk device 30g, for example, it is possible to use a serial ATA (AT Attachment), ATA of parallel transfer and PCI (Peripheral Components Interconnect). Furthermore, regarding the keyboard/mouse 30i and the flexible disk drive 30j, it is possible to use USB (Universal Serial Bus).

Here, the present invention may be all realized by hardware or may be all realized by software. Moreover, it is also possible to realize it by both hardware and software. Moreover, the present invention can be realized as a computer, a data processing system and a computer program. This computer program may be stored in a computer-readable medium and provided. Here, as a medium, an electronic, magnetic, optical, electromagnetic, infrared or semiconductor system (device or equipment) or a propagation medium is possible. Moreover, as a computer-readable medium, there are exemplified a semiconductor, a solid-state storage device, a magnetic tape, a removable computer diskette, a random access memory (RAM), a read only memory (ROM), a rigid magnetic disk and an optical disc. Examples of an optical disc at present include a compact disc read only memory (CD-ROM), a compact disc read/write (CD-R/W) and a DVD.

Although an explanation has been given above using the embodiment of the present invention, the technical scope of the present invention is not limited to the above-mentioned embodiment. It is clear for those skilled in the art that it is possible to add various changes or adopt an alternative mode without departing from the spirit and scope of the present invention.

REFERENCE SIGNS LIST

10 . . . Original code cache
20 . . . Optimized code cache
30 . . . DBT
40 . . . Optimizer
50 . . . Runtime
51 . . . SMC detection unit
52 . . . Mapping processing unit
53 . . . Flag setting unit
54 . . . Trace specifying unit
55 . . . Trace correction unit
56 . . . Thread execution control unit

The invention claimed is:

1. An apparatus for controlling an execution of a binary code by multiple threads, comprising a central processing unit that is configured to:
    detect an occurrence of modification of a first part that is a part of a first binary code by a self-modifying code;
    specify a second part that is a part corresponding to the first part in a second binary code acquired by converting the first binary code, in response to detection of the occurrence of modification of the first part by the self-modifying code;
    to correct the second part such that a specific thread that executes the second part of the second binary code among the multiple threads causes an exception; and
    to maintain a state where a page which is a memory area to store at least part of the first part and include an instruction modified by the self-modifying code is mapped to a virtual page to which page protection is not applied and which is not used, while specifying the second part and correcting the second part.

2. The apparatus of claim 1, wherein the second part is corrected by replacing at least one instruction corresponding to an instruction included in the first part and modified by the self-modifying code among multiple instructions included in the second part, with an interrupt instruction.

3. The apparatus of claim 1, wherein the central processing unit is further configured to perform control such that the specific thread executes the first part of the first binary code modified by the self-modifying code when the exception occurs.

4. The apparatus of claim 3, wherein the specific thread executes the first part of the first binary code after a link from other parts than the second part of the second binary code to the second part is separated.

5. An apparatus for controlling an execution of a binary code by multiple threads, comprising a central processing unit configured to:
    generate an optimized binary code by optimizing an original binary code;
    detect an occurrence of modification of a first part that is a part of the original binary code by a self-modifying code while multiple threads execute the optimized binary code;
    specify a second part that is a part corresponding to the first part in the optimized binary code, in response to detection of the occurrence of modification of the first part by the self-modifying code;
    correct the second part such that a specific thread that executes the second part of the optimized binary code among the multiple threads causes an exception;
    perform control such that the specific thread executes the first part of the original binary code modified by the self-modifying code when the exception occurs; and
    maintain a state where a page which is a memory area to store at least part of the first part and include an instruction modified by the self-modifying code is mapped to a virtual page to which page protection is not applied and which is not used, while specifying the second part and correcting the second part.

6. A non-transitory, computer readable storage medium having computer readable instructions stored thereon that, when executed by a computer, implement a method of controlling an execution of a binary code by multiple threads, the method comprising:
    detecting an occurrence of modification of a first part that is a part of a first binary code by a self-modifying code;
    specifying a second part that is a part corresponding to the first part in a second binary code acquired by converting the first binary code, in response to detection of the occurrence of modification of the first part by the self-modifying code;
    correcting the second part such that a specific thread that executes the second part of the second binary code among the multiple threads causes an exception; and
    maintaining a state where a page which is a memory area to store at least part of the first part and include an instruction modified by the self-modifying code is mapped to a virtual page to which page protection is not applied and which is not used, while specifying the second part and correcting the second part.

7. The storage medium of claim 6, wherein the second part is corrected by replacing at least one instruction corresponding to an instruction included in the first part and modified by the self-modifying code among multiple instructions included in the second part, with an interrupt instruction.

8. The storage medium of claim 6, further comprising executing, by the specific thread, the first part of the first binary code modified by the self-modifying code when the exception occurs.

9. The storage medium of claim 8, wherein the specific thread executes the first part of the first binary code after a link from other parts than the second part of the second binary code to the second part is separated.

* * * * *